United States Patent
Almassi (10) Patent No.: US 11,299,943 B2
(45) Date of Patent: Apr. 12, 2022

(54) HYBRID STATIONARY LOSS CIRCULATION CAKE ACTIVATED IN-SITU

(71) Applicant: Saudi Arabian Oil Company, Dhahran (SA)

(72) Inventor: Faramak Almassi, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

(21) Appl. No.: 17/112,709

(22) Filed: Dec. 4, 2020

(65) Prior Publication Data

US 2021/0172271 A1 Jun. 10, 2021

Related U.S. Application Data (60) Provisional application No. 62/943,461, filed on Dec. 4, 2019.

(51) Int. Cl.
  *E21B 33/138* (2006.01)
  *E21B 21/00* (2006.01)

(52) U.S. Cl.
  CPC .......... *E21B 21/003* (2013.01); *E21B 33/138* (2013.01)

(58) Field of Classification Search
  CPC ............................ E21B 21/003; E21B 33/138
  USPC ......................................................... 166/295
  See application file for complete search history.

(56) References Cited

U.S. PATENT DOCUMENTS

| | | | |
|---|---|---|---|
| 5,161,615 A | 11/1992 | Hutchins et al. | |
| 6,016,879 A | 1/2000 | Burts, Jr. | |
| 7,297,663 B1 | 11/2007 | Kilchrist et al. | |
| 7,331,391 B2 | 2/2008 | Keese et al. | |
| 7,488,705 B2 | 2/2009 | Reddy et al. | |
| 7,612,021 B2 | 11/2009 | Chatterji et al. | |
| 7,923,413 B2 | 4/2011 | Ghassemzadeh | |
| 8,479,817 B2 | 7/2013 | Shindgikar et al. | |
| 8,739,872 B1 | 6/2014 | Miller et al. | |
| 8,927,466 B2 | 1/2015 | Prebensen et al. | |
| 9,518,210 B2 * | 12/2016 | Ezell | C09K 8/512 |
| 9,809,736 B2 | 11/2017 | Murphy et al. | |
| 10,030,190 B2 | 7/2018 | Arias Prada et al. | |

(Continued)

FOREIGN PATENT DOCUMENTS

| | | |
|---|---|---|
| WO | 2016081012 A1 | 5/2016 |
| WO | 2019018211 A1 | 1/2019 |

OTHER PUBLICATIONS

International Search Report and Written Opinion of PCT Application No. PCT/US2020/062948, dated Mar. 12, 2021: pp. 1-14.

*Primary Examiner* — Zakiya W Bates
*Assistant Examiner* — Ashish K Varma
(74) *Attorney, Agent, or Firm* — Bracewell LLP; Constance G. Rhebergen; Linda L. Morgan (57) ABSTRACT

A method for sealing a loss circulation zone of a subterranean well includes delivering a loss circulation product into a wellbore of the subterranean well. The loss circulation product has a solvent, a fibrous material, and a first reactant. The fibrous material traps the first reactant to form a porous cake across a fracture of the loss circulation zone. A second reactant is delivered into the wellbore of the subterranean well, the second reactant passes through the porous cake and reacts with the first reactant, reducing a porosity of the porous cake across the fracture so that the loss circulation product seals the loss circulation zone.

19 Claims, 2 Drawing Sheets

(56) References Cited

U.S. PATENT DOCUMENTS

| | | |
|---|---|---|
| 10,233,372 B2 | 3/2019 | Ramasamy et al. |
| 2003/0201103 A1* | 10/2003 | Brookey .............. C09K 8/50 166/283 |
| 2010/0230164 A1 | 9/2010 | Pomerleau |
| 2011/0278006 A1 | 11/2011 | Sanders et al. |
| 2016/0208567 A1* | 7/2016 | Carrasquilla ......... E21B 21/003 |
| 2016/0312102 A1* | 10/2016 | Whitfill ............... C09K 8/426 |
| 2018/0010030 A1* | 1/2018 | Ramasamy .......... C09K 8/5045 |
| 2018/0334880 A1 | 11/2018 | Jones et al. |

* cited by examiner

HYBRID STATIONARY LOSS CIRCULATION CAKE ACTIVATED IN-SITU

CROSS REFERENCE TO RELATED APPLICATION

This application claims priority to and the benefit of U.S. Provisional Application Ser. No. 62/943,461, filed Dec. 4, 2019, titled "Hybrid Stationary Loss Circulation Cake Activated In-Situ," the full disclosure of which is hereby incorporated herein by reference in its entirety for all purposes.

BACKGROUND OF THE DISCLOSURE

1. Field of the Disclosure

The present disclosure relates to subterranean developments, and more specifically, the disclosure relates to sealing a loss circulation zone of a subterranean well.

2. Description of the Related Art

During the drilling of subterranean wells, such as subterranean wells used in hydrocarbon development operations, drilling mud and other fluids can be pumped into the well. In certain drilling operations, the bore of the subterranean well can pass through a zone that has induced or natural fractures, are cavernous, or otherwise have a greater permeability. Such a zone is known as a loss circulation zone. These loss circulation zones can be a result of weak formations, permeable rocks, or fractures that occurs naturally or are induced while drilling.

In such a case, the drilling mud and other fluids that are pumped into the well can flow into the loss circulation zone and all, or a portion of the drilling mud and other fluids can be lost in the loss circulation zone. Lost circulation can be encountered during any stage of hydrocarbon development operations. Lost circulation can be identified when drilling fluid that is pumped into the subterranean well does not return to the surface or returns only partially. While some fluid loss is expected, excessive fluid loss is not desirable from a safety, an economical, or an environmental point of view. Lost circulation can result in difficulties with well control, borehole instability, pipe sticking, unsuccessful production tests, poor hydrocarbon production after well completion, and formation damage due to the plugging of pores and pore throats by mud particles. In extreme cases, lost circulation problems may force abandonment of a well. Sealing these problematic zones is important before continuing to drill the rest of the well.

SUMMARY OF THE DISCLOSURE

In some current systems for sealing loss circulation zones the technique relies on two pills separated by a spacer pumped in the loss zone. Once two pills come in contact in the fracture, a solid or viscous product is produced to cure lost circulation. These pills require good mixing in the fracture. However, the two mobile pills travelling towards the loss circulation zone are separated by a spacer and have a preference to follow a plug flow path and sometimes do not mix well. In some cases the techniques have attempted to bring about better mixing by using pills of different densities or assisting with intermixing once the pills leave drill pipe and enter the fracture.

An alternative current method is to pump one pill down a drill pipe and the other pill down the tubing casing annulus. This method relies on the material coming in contact outside of the drill pipe and the mixing taking place as the two streams make their way down the fracture. There has been limited success with these methodologies. As a result, the composition of the produced product for sealing the loss circulation can be non-uniform due to poor mixing and due to possible contamination with drilling fluid, which is competing with the pills to get into the fracture.

Embodiments of the current application provide methods and systems that include a first pill that has a solvent that is mixed with fibers and a first reactant. The solvent can be selected to prevent or delay the reaction of the first reactant until after the fibers and first reactant have formed a cake across the fracture and a reactor pill is delivered to react with the first reactant. As an example, one of the first reactant and the second reactant can be a binder and the other can be an activator. The fibers trap the first reactant and position the first reactant in the correct location within or across the fracture to be effective once the reaction process is initiated. The second reactor pill can include an aqueous fluid that can react with the first reactant. As the reaction between the first reactant and the second reactant takes place, the permeability of the resulting matrix is reduced and the cake is squeezed into the fracture, completely sealing the fracture.

In an embodiment of this disclosure, a method for sealing a loss circulation zone of a subterranean well includes delivering a loss circulation product into a wellbore of the subterranean well. The loss circulation product has a solvent, a fibrous material, and a first reactant. The fibrous material traps the first reactant to form a porous cake across a fracture of the loss circulation zone. A second reactant is delivered into the wellbore of the subterranean well. The second reactant passes through the porous cake and reacts with the first reactant and reduces a porosity of the porous cake across the fracture so that the loss circulation product seals the loss circulation zone.

In alternate embodiments, the fibrous material can include a natural fiber. The loss circulation product can further include a particulate matter. The first reactant can be a granular starch that is non-pregelatinized. The second reactant can be water. The solvent can be a non-aqueous solvent. Alternately, the first reactant is selected from a group consisting of a starch, a monomer, a polymer, a resin, a cement, and combinations of such first reactants.

In other alternate embodiments, after delivering the loss circulation product into the wellbore and before delivering the second reactant into the wellbore, a spacer fluid can be delivered into the wellbore of the subterranean well. After delivering the second reactant into the wellbore of the subterranean well, the first reactant can react fully with the second reactant within thirty minutes. Alternately, after delivering the second reactant into the wellbore of the subterranean well, the first reactant can react fully with the second reactant within five minutes. After delivering the second reactant into the wellbore of the subterranean well, the porous cake can be squeezed into the fracture.

In an alternate embodiment of this disclosure, a method for sealing a loss circulation zone of a subterranean well includes delivering a loss circulation product into a wellbore of the subterranean well. The loss circulation product has a non-aqueous solvent, a fibrous material, and a starch binder that is a granular starch that is non-pregelatinized. The fibrous material traps the starch binder to form a porous cake across a fracture of the loss circulation zone. An activator is delivered into the wellbore of the subterranean well, the activator including water and passing through the porous cake so that the water reacts with the starch binder such that the starch binder reduces a porosity of the porous cake to form a loss circulation sealant across the fracture that seals the loss circulation zone.

In another alternate embodiment of this disclosure, a system for sealing a loss circulation zone of a subterranean well includes a porous cake formed across a fracture of the loss circulation zone of a wellbore. The porous cake is formed by a loss circulation product having a solvent, a fibrous material, and a first reactant. The fibrous material is operable to trap the first reactant to form the porous cake. A second reactant is selected to react with the first reactant as the second reactant passed through the porous cake, such that a porosity of the porous cake across the fracture is reduced and the loss circulation product seals the loss circulation zone.

In alternate embodiments, the fibrous material can include a natural fiber. The loss circulation product can further includes a particulate matter. The first reactant can be a granular starch that is non-pregelatinized. The second reactant can be water. The solvent can be a non-aqueous solvent. Alternately, the first reactant can be selected from a group consisting of a starch, a monomer, a polymer, a resin, a cement, and combinations of such first reactants. A spacer fluid can be deliverable into the wellbore of the subterranean well before the second reactant.

BRIEF DESCRIPTION OF THE DRAWINGS

So that the manner in which the features, aspects and advantages of the embodiments of this disclosure, as well as others that will become apparent, are attained and can be understood in detail, a more particular description of the disclosure may be had by reference to the embodiments that are illustrated in the drawings that form a part of this specification. It is to be noted, however, that the appended drawings illustrate only certain embodiments of the disclosure and are not to be considered limiting of the disclosure's scope, for the disclosure may admit to other equally effective embodiments.

DETAILED DESCRIPTION

The disclosure refers to particular features, including process or method steps. Those of skill in the art understand that the disclosure is not limited to or by the description of embodiments given in the specification. The subject matter of this disclosure is not restricted except only in the spirit of the specification and appended Claims.

Those of skill in the art also understand that the terminology used for describing particular embodiments does not limit the scope or breadth of the embodiments of the disclosure. In interpreting the specification and appended Claims, all terms should be interpreted in the broadest possible manner consistent with the context of each term. All technical and scientific terms used in the specification and appended Claims have the same meaning as commonly understood by one of ordinary skill in the art to which this disclosure belongs unless defined otherwise.

As used in the specification and appended Claims, the singular forms "a", "an", and "the" include plural references unless the context clearly indicates otherwise.

As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Where a range of values is provided in the specification or in the appended Claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended Claims to a method comprising two or more defined steps, the defined steps can be carried out in any order or simultaneously except where the context excludes that possibility.

Figure 1:
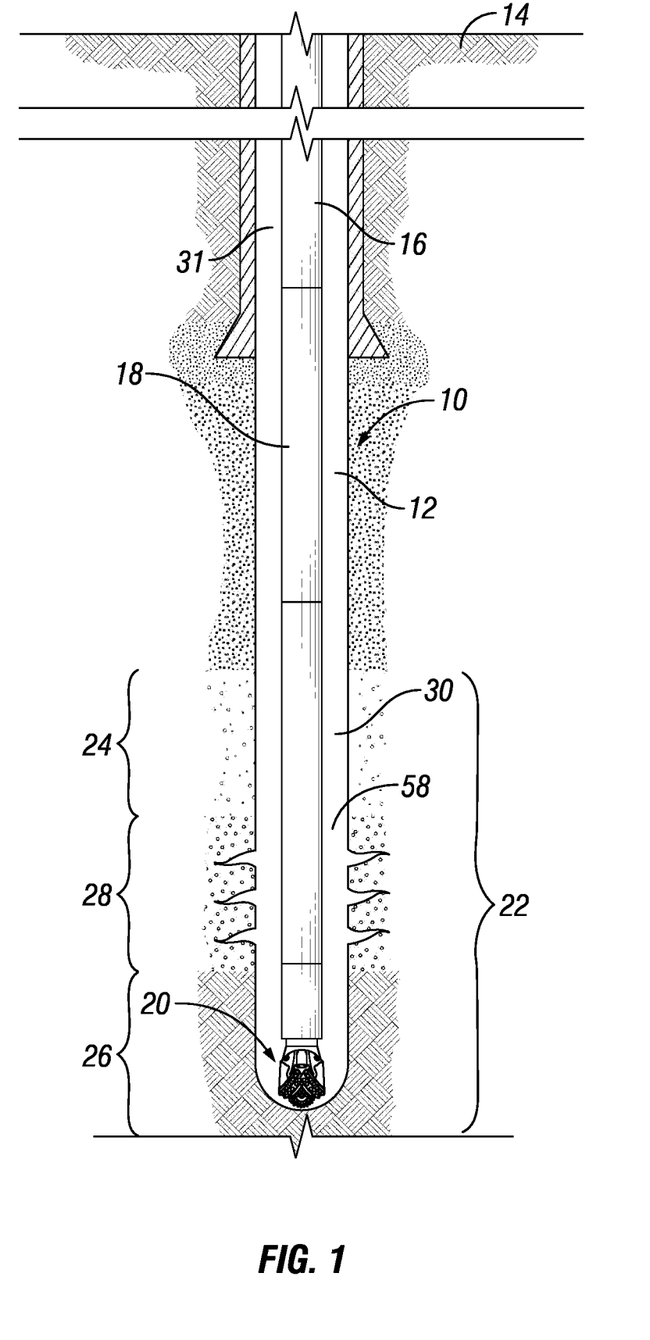
FIG. 1 is a section view of a subterranean well with a loss circulation zone, in accordance with an embodiment of this disclosure.

Looking at FIG. 1, subterranean well 10 can have wellbore 12 that extends to an earth's surface 14. Subterranean well 10 can be an offshore well or a land based well and can be used for producing hydrocarbons from subterranean hydrocarbon reservoirs. Drill string 16 can be delivered into and located within wellbore 12. Drill string 16 can include tubular member 18 and bottom hole assembly 20. Tubular member 18 can extend from surface 14 into subterranean well 10. Bottom hole assembly 20 can include, for example, drill collars, stabilizers, reamers, shocks, a bit sub and the drill bit. Drill string 16 can be used to drill wellbore 12. In certain embodiments, tubular member 18 is rotated to rotate the bit to drill wellbore 12.

Wellbore 12 can be drilled from surface 14 and into and through various formation zones 22 of subterranean formations. Formation zones 22 can include layers of reservoir that are production zones, such as an uphole production zone 24 and a downhole production zone 26. Formation zones 22 can also include loss circulation zone 28. In the example embodiments of FIGS. 1-2, loss circulation zone 28 is a layer of the formation zones 22 that is located between uphole production zone 24 and downhole production zone 26. In alternate embodiments, loss circulation zone 28 can be uphole of uphole production zone 24 or downhole of downhole production zone 26. Alternately, loss circulation zone 28 could be identified before any production zone is reached within wellbore 12, or after only one production zone is identified within wellbore 12, or after more than two production zones are identified within wellbore 12.

In an embodiment of this disclosure, loss circulation zone 28 can undergo a large fluid loss. In a laboratory setting, a large fluid loss can refer to scenarios where the material filters as if filtering a solvent, such as water or diesel, through a filter paper. For example 500 milliliters (ml) of 10 percent (%) solution of loss circulation material in a solvent will de-fluidize in less than three minutes when a pressure of 100 pounds per square inch (psi) is applied. If greater pressures are applied the sample de-fluidizes quicker and the concentration of loss circulation material has little effect of the rate of de-fluidization.

In alternate embodiments of this disclosure, loss circulation zone 28 can result in a pressure differential between the hydrostatic pressure within wellbore 12 and the pressure of loss circulation zone 28 that is in a range of 100 psi to 5,000 psi.

The formation zones 22 can be at an elevation of uncased open hole bore 30 of subterranean well 10. Drill string 16 can pass though cased bore 31 of subterranean well 10 in order to reach uncased open hole bore 30. Alternately, the entire wellbore 12 can be an uncased open hole bore.

Looking at FIGS. 2-5, systems and methods of this disclosure provide for sealing of fracture 32 of loss circulation zone 28. Looking at FIG. 2, in order to seal fracture 32, loss circulation product 34 can be delivered into wellbore 12. Loss circulation product 34 can form porous cake 36 across fracture 32 of loss circulation zone 28. Loss circulation product 34 can be delivered as a pill into wellbore 12. As used in this disclosure, a "pill" is a limited quantity of a fluid that is pumped into wellbore 12 during drilling operations.

Figure 2:
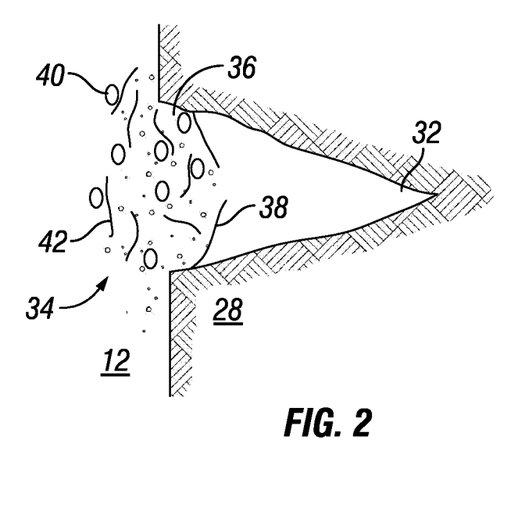
FIG. 2 is a schematic section view of a fracture of a loss circulation zone, shown with a loss circulation material forming a porous cake across the fracture, in accordance with an embodiment of this disclosure.

Loss circulation product 34 includes fibrous material 38 and first reactant 40, which can be delivered within a solvent. Loss circulation product 34 can be formulated to de-fluidize rapidly as soon as loss circulation product 34 is set across fracture 32 in order to build porous cake 36.

The addition of fibrous material 38 will not adversely affect the filtration rate or rapid de-fluidization of loss circulation product. Fibrous material 38 can act as a sieve, trapping first reactant 40 uniformly within the network structure of fibrous material 38 when forming porous cake 36 across fracture 32 of loss circulation zone 28. The trapping of first reactant 40 within the matrix of fibrous material 38 allows for first reactant 40 to be ideally positioned for sealing fracture 32 before and until first reactant 40 is activated to seal across fracture 32.

In certain embodiments, loss circulation product 34 can further include particulate matter 42. Particulate matter 42 can provide additional strength. Fibrous material 38 can be effective at trapping first reactant 40 but can weaken when wet for an extended period of time. Therefore, a combination of fibrous material 38 and particulate matter 42 can be stronger than using fibrous material 38 alone, while maintaining the functionality of fibrous material 38 in trapping first reactant 40.

Figure 3:
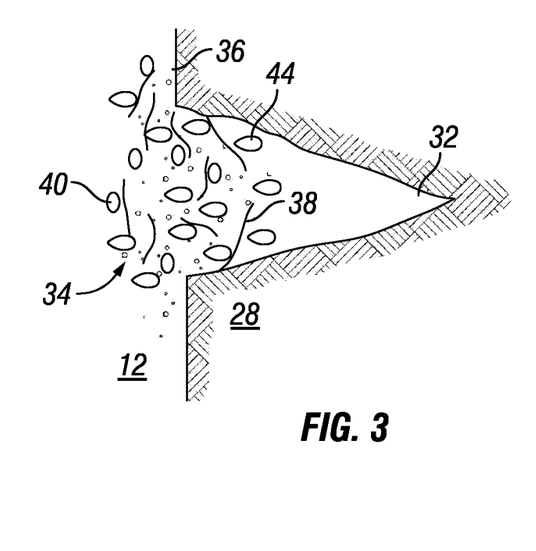
FIG. 3 is a schematic section view of a fracture of a loss circulation zone, shown with a second reactant passing through a porous cake across the fracture, in accordance with an embodiment of this disclosure.

Looking at FIG. 3, second reactant 44 can be delivered as a pill into wellbore 12. Because loss circulation product 34 formed a porous cake 36, second reactant 44 is able to pass between and through fibrous material 38 and first reactant 40 of porous cake 36. Second reactant 44 is selected to react with first reactant 40 as second reactant 44 passed through porous cake 36. The reaction between first reactant 40 and second reactant 44 reduces the porosity of porous cake 36 to form loss circulation sealant 46, shown in FIGS. 4-5. Looking at FIGS. 4-5, loss circulation product 34 that has formed loss circulation sealant 46 can seal across fracture 32 to seal loss circulation zone 28.

In some currently available systems, the loss circulation material relies on an increase in downhole temperature to initiate the gelation or hardening reaction. Such systems can use a single pill for delivery of the loss circulation material, which can include a retarder to ensure that the loss circulation material does not set within the drill pipe. The pill then enters the loss circulation zone and must wait for the required temperature to be reached to bring about the reaction or activation. During such time, the loss circulation material can be diluted with drilling mud, which can compromise the mechanical properties of the resulting plug, and increasing the time it takes to gel or harden. For improved performance of the loss circulation material in such system the loss circulation material must stay stationary for several hours until the activation initiation temperature is reached.

Embodiments of the current disclosure instead require minimum setting time. Because loss circulation product 34 is retaining first reactant 40 within the matrix of fibrous material 38 at the desired location of activation, the activation of first reactant 40 can take place immediately upon interaction with second reactant 44. Second reactant 44 and first reactant 40 do not come into contact with each other inside the drill sting. Therefore in embodiments of this application, the use of retarders and other delaying chemicals in the first pill or the reactor pill can be avoided because the risk of loss circulation product 34 setting up within the drill string has been mitigated.

Figure 4:
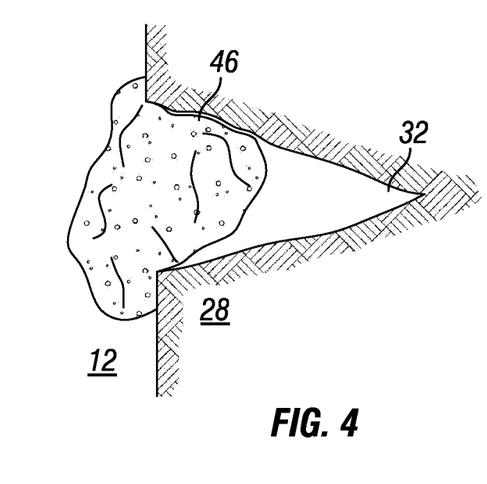
FIG. 4 is a schematic section view of a fracture of a loss circulation zone, shown with a loss circulation sealant across the fracture, in accordance with an embodiment of this disclosure.

In the example embodiment of FIG. 4, loss circulation sealant 46 is located partially within fracture 32 and partially within wellbore 12. Looking at FIG. 5, loss circulation sealant 46 has been squeezed further into fracture 32. The reduction in porosity between porous cake 36 and loss circulation sealant 46 allows for loss circulation sealant 46 to more be easily squeezed into fracture 32. As loss circulation sealant 46 is squeezed into fracture 32, less or no loss circulation sealant 46 is left remaining in wellbore 12 and all or substantially all of loss circulation sealant 46 has entered loss circulation zone 28.

Figure 5:
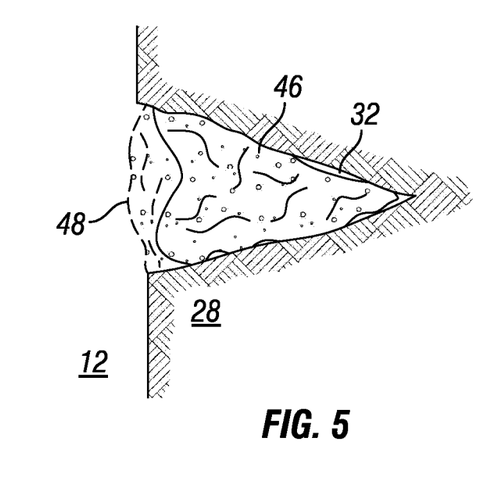
FIG. 5 is a schematic section view of a fracture of a loss circulation zone, shown with the loss circulation sealant after being squeezed into the fracture, in accordance with an embodiment of this disclosure.

If any excess material 48 is located outside of fracture 32 within wellbore 12, after drilling resumes excess material 48 is drilled, washed, or shaved off, leaving the material in fracture 32 intact. In some currently available systems, the loss circulation material builds a skin on the surface of the inner diameter wall of the wellbore. In such systems, the skin can be dislodged, eroded, or otherwise damaged by drilling and other completion and production operations, which will reduce or eliminate the effectiveness of the seal across the loss circulation zone.

The time required for first reactant 40 to react fully with second reactant 44 and transition from porous cake 36 to loss circulation sealant 46 will be dependent on the substance that is selected for first reactant 40 and second reactant 44. In certain embodiments, after delivering second reactant 44 into wellbore 12 of subterranean well 10, first reactant 40 reacts fully with second reactant 44 within thirty minutes. In alternate embodiments, after delivering second reactant 44 into wellbore 12 of subterranean well 10, first reactant 40 reacts fully with second reactant 44 within five minutes. In other alternate embodiments, first reactant 40 reacts fully with second reactant 44 substantially instantaneously.

In certain embodiments, after delivering loss circulation product 34 into wellbore 12 and before delivering second reactant 44 into wellbore 12, a spacer fluid can be delivered into wellbore 12 of subterranean well 10 as a spacer pill. The spacer fluid can prevent the premature mixing of second reactant 44 with first reactant 40. The spacer pill can also pretreat trapped first reactant 40 as the spacer pill flushes through porous cake 36. Such pretreatment can include washing particulates within porous cake 36 free of solvent, such as with a surfactant, or changing the pH, the salinity, or the water wettability of the fibrous network. The spacer pill can pre-establish conditions required for a reaction between first reactant 40 and second reactant 44 when second reactant 44 percolates through porous cake 36. Such pre-establish conditions can include establishing oxidizing or reducing environment before the second reactant 44 percolates through porous cake 36. As used in this disclosure, the term "spacer pill" is used to define a pill that is delivered between other pills, such as after a first pill and before a third pill. In embodiments of this disclosure a spacer pill may not merely be a separator between other pills, but may perform a function in relation to such other pills, such as reacting with components of such other pills.

Fibrous Material

Looking at FIG. 2, fibrous material 38 can include a natural fiber. Fibrous material 38 can further include synthetic fibers together with the natural fiber. When preparing loss circulation product 34, fibrous material 38 can be included in a range of 10-100 pounds per barrel (lb/bbl) of solvent. The fibers of fibrous material 38 can include fibers with a length, up to 5 centimeters (cm) and a diameter up to 1 cm. In example embodiments, fibrous material 38 can include natural fibers such as, for example, the shells or pits of nuts, seeds, or fruit, materials derived from wood products such as wood shavings, wood bark, chopped up paper, shredded paper, wet pulp residue, materials derived from plant matter such as *psyllium* husk, corn stalks, corn cobs, flake cellophane, rice hulls, cocoa bean shell material, oat hulls, citrus pulp, grape pumice, tomato pumice, sugar cane, flax, straw, ground hemp, coconut, cotton, wool, silk, hemp, linen, jute, or agave, naturally occurring mineral fibers or metallic flakes or fibers such as asbestos, silica, or calcium or aluminum oxide based fibers, mineral wool, or any combination of such natural fibers.

In embodiments where fibrous material 38 includes a synthetic fiber the synthetic fibers can include, for example, cellophane or fine strands of plastic rope. In alternate embodiments, the synthetic fibers can include, for example, carbon fibers, carbon fiber composites, glass fibers, glass fiber composites, metal alloy fibers, plastic fibers, thermoplastic fibers, polymeric elastomers, rubbers, latexes, ceramic fibers, or any combination of such synthetic fibers.

Generally speaking, fibrous material 38 could include natural fibers in an amount that is ten times the concentration of synthetic fibers before encountering difficulty with pumping loss circulation product 34 through the drill bit. Synthetic fibers cannot be pumped in large concentrations through the drill bit because synthetic fibers can be relatively thin compared to natural fibers, resulting in more surface area, which in turn can result in the creation of web-like structures that will trap solid matter and plug the drill bit.

In embodiments of this disclosure, fibrous material 38 can include 0-100% natural fibers. In alternate embodiments, fibrous material 38 can include 0-100% synthetic fibers. Natural fibers can be prone to strength loss compared to synthetic fibers. As an example, if a piece of natural fiber such as straw or wood shaving is left in boiling water, such natural fiber can lose strength after several hours. Therefore, it can be beneficial to include synthetic fibers in combination with natural fibers. In embodiments of this disclosure, fibrous material 38 can therefore include a mixture of natural fibers and synthetic fibers. Fibrous material 38 can include a mixture of rigid and flexible fibers. Fibrous material 38 can be water insoluble. Fibrous material can alternately be soluble in acid or caustic solution.

In embodiments where particulate matter 42 is used, particulate matter 42 is combined with fibrous material 38 to form a strengthened loss circulation product 34. Particulate matter 42 can be, for example, ground shells and hulls such as ground walnut shells, peanut shells, almond shells, cashew shells, brazil nut shells, chestnut shells, pistachio shells and pecan shells, cottonseed hulls, coconut shells, mica, granite, calcium carbonate, rubber, barite, hematite, drilled cuttings, glass beads, ground glass beads, sand, diatomaceous earth, perlite, cellophane flakes, cement, bentonite, kaolinite, petroleum coke, ground corn cob outers, rice fraction, clay, and particulate graphite.

When preparing loss circulation product 34, particulate matter 42 can be included in a range of up to 250 lb/bbl of solvent which is equivalent to 715 kilogram per meters cubed. Particulate matter 42 can be a pulverized fine powder up to gravel sized. Particulate matter 42 can have a diameter in a range of up to 5 cm. As an example, particulate matter 42 can have a diameter in a range of 10 microns to 5 cm. Particulate matter 42 can have a generally spherical shape, or can have an irregular shape. In certain embodiments particulate matter 42 can be acid soluble so that particulate matter 42 can be dissolvable when treated with acid.

Particulate matter 42 can have a hardness of 1 as measured by the Mohr hardness, such as when particulate matter 42 is, for example, talc. Particulate matter 42 can have up to a hardness of 5-6 as measured by the Mohr hardness scale, such as when particulate matter 42 is, for example, magnetite or granite. Particulate matter 42 can have sufficient resiliency to deform under pressure and return to the original shape of particulate matter 42 after such pressure has been removed. In an example, particulate matter 42 can have a resiliency in a range of 30-100%.

When preparing loss circulation product 34, the combination of fibrous material 38, particulate matter 42 and platelet materials can be included in a range of up to 250 lb for every barrel of solvent. In an example embodiment, fibrous material 38 can be in an amount of 100 lb/bbl, particulate matter 42 can be in an about of 130 lb/bbl, and platelet materials can be in an amount of 20 lb/bbl. As used in this disclosure, platelet materials are a type of particulate matter 42 that have flat structure and produced by means other than simple crushing. As an example, some calcium carbonate material are produced from sea shell in a manner that such materials are shaped similar to slate or paper in that they are thin but have a large surface area. As a further example, mica minerals can flake off to form paper thin platelets.

Binder

The binder, which can be either first reactant 40 or second reactant 44 is used to bind fibrous material 38 together and form a gel, dough, or glass-like substance in order to permanently plug loss circulation zone 28. The binder can be, for example, a starch, a monomer, a polymer, a resin, a cement, or a combinations of such example binders. In each case, the binder is selected such that the binder is not soluble or activated within the solvent during mixing, delivery, or when located at loss circulation zone 28 until the activator, which is the other of the first reactant 40 or second reactant 44 interacts with the binder. The binder can further be selected to be a powder or granular type substance that is susceptible to being trapped by fibrous material 38. In addition the binder can be selected to be a liquid trapped in a bead with a gelatinous or hard coating.

Examples of monomers or polymers that could be used as the binder include swellable monomers and polymers. As an example, the binder could be a crosslinked polyacrylamide or polyacrylate, a copolymer of acrylamide and acrylate monomers, hydrolyzed polyacrylonitrile, polysaccharides, mucilage and their derivatives, lignosulfonates, chitins, chitosans, proteins, proteinous materials, fatty alcohols, fatty esters, fatty acids and salts, aliphatic polyesters, poly(lactides), poly(glycolides), poly(amino acids), poly(aspartic acid) and any combination of such materials. The monomers or polymers used as the binder can be selected to be inactive in the solvent that carries loss circulation product 34, and can be reactive when coming into contact with activator 44.

The binder can be a natural or modified organic polymer. In certain embodiments where the binder is a natural or modified polymer, water can act as an activator. A natural or modified polymer that could be used as the binder include natural xanthan, mucilage and, guar gums and their derivatives, derivatised or modified starches or modified or derivatised cellulose, natural and modified alginate polymers, polyvinylalcohols, polyvinyl acetates and polyacrylamides. Such example natural or modified polymers that can be used as the binder are water soluble. At lesser concentrations such natural or modified polymers can increase water viscosity and at greater concentrations such natural or modified polymers can create a gel. Further, such example natural or modified polymers do not require heat to dissolve. The viscosity of hydrated gel after water activation is a function of the binder concentration employed in the pill that contains the binder.

If suspended in nonaqueous solvent and trapped in porous cake 36, then when the natural or modified polymers come in contact with water the natural or modified polymers will start hydration and increase the viscosity of surrounding water as they dissolve and form gels that can have a dough-like consistency that can plug fracture 32. As an example, a composition using 3 lb/bbl of such example natural or modified polymers can have a consistency similar to viscous honey at room temperature and may flow through the porous structure of the porous cake 36. As a further example, a composition using 50 lb/bbl of such example natural or modified polymers can have a consistency with a significantly larger viscosity when the composition comes in to contact with water. Uniformly entrapped polymer granules may not fully hydrate and dissolve due to lack of available free water. Partially hydrated polymer has a viscous gel consistency and develop a consistency known as "fish eyes" in the industry, blocking free water from passing through porous channels in the loss circulation network. The hydrostatic pressure gradually develops across loss circulation sealant 46 and squeezing loss circulation sealant 46 into fracture 32 when the dough consistency of loss circulation sealant 46 is formed. As squeezing begins the fish eyes and particulates materials are further compressed and the micro channels in the structure of fracture 32 are further plugged by the fish eye and jelly consistency of the loss circulation sealant 46, reducing free water filtration rate through loss circulation sealant 46 to almost zero.

In alternate example embodiments, cross linking can be utilized in combination with the binder to create a hard gel. As an example, if guar gum is used as the binder, borax can be used for cross linking with the binder to create a loss circulation sealant 46 that has a rubber-like consistency. Other known cross-linkers that could be used with the binder include zirconium, chromium, titanium, iron based inorganic salts, or organometallic compounds of such cations. Also organic cross linkers such as glyoxals, and formaldehyde can be employed. Certain cross linking reactions can be activated with exposure to a pH above a threshold level, and will not cross link below such threshold level. As an example, if borax and guar gum are mixed together in an environment with a pH value lower than 8, the resulting fluid has low rheology and can be pumped into wellbore 12 efficiently. If the pH is raised to above 8.5, the guar gum can cross link.

In an example of use of cross linking, a first pill could include fibrous material 38 with a buffering materials such as Magnesium oxide or high pH activator material such as caustic or soda ash powder, in an alcohol solvent. Alternatively water can be used as solvent lime and magnesium oxide are sparingly soluble in water and the partial water solubility of these pH modifiers can be used advantageously to eliminate the need for using organic solvents. At concentrations greater than 5 lb/bbl, a sufficient amount of solid magnesium oxide and lime will be retained in the fibrous network to facilitate the required pH for the cross linking reaction. A spacer can be delivered secondly as a spacer pill, followed by a reactor pill containing borax in a range of 0.01-1 lb/bbl and guar gum as the binder in a concentration range of 1-10 lb/bbl. In such an embodiment the caustic, soda ash, lime, or magnesium oxide material is trapped in porous cake 36 and can act as an activator to initiate the cross linking between the guar gum and borax solution as the guar gum and borax solution percolates through porous cake 36.

A similar method may be used with a reactor pill that includes polyvinyl alcohol and borax, polyvinyl alcohol and zirconium, or guar gum and zirconium solutions. In each case, when in an acidic solution the reactor pill includes pumpable fluids, and when such reactor pill percolates through the caustic material trapped in porous cake 36, the caustic material will initiate the cross linking reaction, immediately forming loss circulation sealant 46 that can have a solid gelatinous or rubbery consistency as determined by the reactants concentrations in the reactor pill.

With some cross linkers, such as Borax, the reactions are pH reversible. As an example, when the pH is greater than 8.5 the loss circulation sealant 46 can become solid and when the pH is reduced below 8.5 components of loss circulation sealant 46 become liquid again. The process is repeatable. The advantage of using such a cross linking agent is that loss circulation sealant 46 can be used to seal fracture 32 and at a later date and the components of loss circulation sealant 46 can be removed easily to allow for a flow of hydrocarbon from the same fracture 32.

As an example, a cross linked guar component of loss circulation sealant 46 that has been previously spotted can un-cross link in an acidic environment. Spotting acid into the loss circulation sealant 46 will destroy the dough consistency of loss circulation sealant 46 at a surface of loss circulation sealant 46 allowing permeation of the acid into loss circulation sealant 46. The acid can gradually neutralize the caustic, lime, or magnesium oxide and create an acidic environment. The acid can keep moving further towards and into fracture 32 as the components of loss circulation sealant 46 continue to return to a liquid state until the acid has reached all parts of loss circulation sealant 46. In such embodiments, acid soluble particulate minerals such as calcium carbonate can be added to loss circulation product 34. When the acid pill is delivered to loss circulation sealant 46, the acid soluble particulate minerals can dissolve and form channels through which the acid can flow, expediting the un-cross linking process. The composition of loss circulation product 34 can be tailored by changing the concentration of entrapped pH generating reagents such as magnesium oxide and lime solid particles to arrive at the desired effect for a particular reservoir.

In yet other alternate embodiments, loss circulation sealant 46 of viscous pill with a dough like constancy can be created as the result of a calcium ion cross linking with sodium alginate. Loss circulation sealant 46 can have the consistency of a dough and can harden to result in a hard gel similar to cross linked guar, if sufficient cross linking takes place. In such an embodiment, partially water soluble minerals such as gypsum or acid soluble minerals such as Calcium carbonate or soluble calcium salts such as calcium chloride or bromide could act as an activator that is trapped in porous cake 36. The solvent can be water for acid soluble minerals and partially water soluble calcium compounds or can be an organic solvent such as an alcohol, glycol or hydrocarbon for water soluble salts such as calcium chloride and bromide. Sodium alginate that is dissolved in water can be delivered in a pill that percolates through porous cake 36 containing the stationary phase crystals of calcium chloride salt. Water dissolves and releases calcium ions required to cross link the sodium alginate. If sodium alginate is dissolved in acidic water and delivered across a fibrous pill formulated with calcium carbonate or lime, as the acidic pill percolates through cake 36 it dissolves calcium carbonate or lime and releases calcium ion required to cross link the sodium alginate. The acid concentration and calcium carbonate or lime particle size can be optimized to control rate of calcium ion dissolution and subsequent cross-linking reaction. In general, the rate of chemical reaction is affected, for example, by the composition of the pills and the size of the particle size of the chemical reagents.

In alternate embodiments, the binder can be an organic resin. Organic resins can be generally glass type hard materials that can be flexible or inflexible. As an example, a phenolic or novolac resin, or bisphenol A, B or S can be used as the binder. Such organic resins can be a solid. The organic resin can be cross linked with an amine such as aliphatic or aromatic or modified amines dissolved in an appropriate solvent assisting with the dissolution of trapped organic resin powder and subsequent cross linking reaction. The resulting cross linked loss circulation sealant 46 can be a solid. In an alternate example the activator can be trapped in the fibrous network. The resins dissolved in a selected solvent facilitating dissolution of the activator to bring about a cross linking reaction. In alternate example embodiments, the binder can include melamine or urea formaldehyde resins, epoxy resins, thermosetting novolac or resoles resins and can be cross linked using cross linking agents such as hexamethylenetetraimine hardener or other amine hardeners.

Additional examples of binders could include particulates that are water super absorbers. Such particulates can absorb water exceeding their volume by factor of 1-1000 and form a jelly-like structures with no change in the viscosity of free water in the surrounding solution. As such particulates expand the expanding particulates fill void space in the fibrous loss circulation network and bind loss circulation sealant 46 together by the action of expansion. During such expansion hydrostatic pressure is developed across loss circulation sealant 46 as the void channels are constricted and binding takes place. As a result, loss circulation sealant 46 can be squeezed into fracture 36.

The expansion factor of water super absorbers particulates is primarily a function of water salinity and in some instances affected by pH. The salinity factor is employed in an example embodiment to assist with trapping unexpanded particulates at the face of fracture and expansion of the super absorber can be initiated using fresh water. As an example, the binder could be formed of a hydrolyzed product of polyacrylamide or polyacrylate. This class of particulates and resins can swell marginally, such as swell about five times original size in saturated brines and expand exponentially as the salinity is reduced. In fresh water and ideally deionized water such water super absorbers can expand up to one thousand times original volume. A pill containing water super absorber polymers can be delivered to fracture 36 in a highly saline or organic solvent. Fresh water or a pH adjustor can be used as the activator to reduce the saline environment.

Other materials can also be used to make a superabsorbent polymer, such as, ethylene maleic anhydride copolymer, cross-linked carboxymethylcellulose, polyvinyl alcohol copolymers, cross-linked polyethylene oxide, and starch grafted copolymer of polyacrylonitrile. The concentration of resin can be in a range of 1-50 lb/bbl. The resins used as the binder can be selected to be inactive in the solvent, which can be, for example, a saline or pH or buffer modified water, or organic solvent that carries loss circulation product 34, and can be reactive when coming into contact with activator 44, which can be, for example, fresh water. In alternate embodiments, such water super absorbers can be used as particulate matter 42 and combined with fibrous material 38 to form a strengthened loss circulation product 34. In such an embodiment, a separate binder that is a product other than a water super absorber can be used.

Other example of binders could include particulates that are plant seeds and husks with higher content of mucilage. Such material can be known as a mucilage based binder. A mucilage based binder can absorb water exceeding their original volume by factors up to 20 and form a jelly like structure. Mucilage based binders can also cause a change in the viscosity of the surrounding free water. As such particulates expand the void space in the fibrous loss circulating material is filled and a viscous natural resin is produced, binding sealant 46 together and squeezing plug into the fracture 36.

In alternate embodiments, the binder can be an inorganic chemical. Examples of cement that can be used as the binder include API cements such as class of G, A, C or H cement, and construction cements such as ASTM type I, II, III cements. The cement can have a particle size in a range of 0.1-200 micron and can be grounded for optimum performance. The amount of cement used as the binder can be in a range of 50 lb to 550 lb of cement powder per barrel of pill. The cement used as the binder can be selected to be inactive in the solvent that carries loss circulation product 34, and can be reactive when coming into contact with the activator.

The binder can alternately include a granular starch that is non-pregelatinized. The starch can be custom tailored by using different sources of starch. Generally, starch gelatinizes at temperatures greater than 60 degrees Celsius (° C.) in the presence of water. After starch gelatinizes, there is an increase in the volume of starch granules and filtration of the free water becomes almost impossible.

Alternately, the starch can be chemically modified, such as being phosphorylated. The phosphorylation reaction of starch alters starch gelatinization temperatures and gel consistency, which may be helpful for certain downhole conditions.

For currently available drilling application starch is pregelatinized or otherwise modified to provide for a consistent product whose property and activation is not affected by the temperature downhole. Embodiments of this disclosure instead used ungelatanized starch and rely on the well bottom hole temperature to gelatinize the starch and to form a gelatinous mass that could not have been pumped from surface.

Solvent

The solvent used in loss circulation product 34 can be selected so that the binder is not activated as the binder is being delivered to loss circulation zone 28. With proper selection of the solvent, a retarder is not required. It is the solvent instead of a retarder that delays the activation of the binder. Embodiments of this disclosure therefore do not rely solely on the use of a retarder and a downhole temperature to induce reactions. Elevated downhole temperatures can inadvertently initiate polymerization reaction of loss circulation pills that are currently used in the industry, which can cause the loss circulation material to harden or gel before reaching the loss circulation zone. In embodiments of this disclosure, the solvent can be selected so that loss circulation sealant 46 is not formed until after the activator is delivered to loss circulation product 34.

If a monomer or polymer is used as the binder then the solvent can be a fluid that will reduce the kinetics of a chemical reaction of the monomer or polymer. As an example, if the monomer or polymer is a monomer or polymer that swells in contact with water, then the solvent can be a non-aqueous solvent. In such an embodiment, the solvent can be a non-polar solvent that is immiscible with water and requires the use of a surfactant, or can be a polar solvent that is miscible with water and may not require the use of a surfactant.

Example non-polar solvents can include diesel, straight or branched hydrocarbons that are made up of carbon and hydrogen only and in the aliphatic or aromatic range in molecular weight from C6 (hexane) to mineral oils (C30 or higher) or high molecular weight alcohols above C4 that are branched or unbranched, Ketone (C2-C30 branched or unbranched), aldehyde (C1-C30 branched or unbranched), Ester C1-C30 branched or unbranched) Amines (C1-C30 branched or unbranched) Amides (C1-C30 branched or unbranched), Ethers (C1-C30 branched or unbranched) and oils. Esters, oils, ethers, amides, amines, aldehydes, ketones functionality provide a low polar solvent or are immiscible with water, or both. These immiscible solvents can leave a residue of solvent on porous cake 36 and therefore require a surfactant. The surfactant can be included in the spacer pill, which can be the second pill delivered into well 10 to render surfaces of porous cake 36 free of solvent so that when the reactor pill percolates through porous cake 36 a reaction of the binder is not affected by residual solvent coatings.

Example polar solvents can include short chain alcohols in the C1-C4 range and liquid glycols or polyglycols and polyoxyalkylene glycols. Such solvents can mix with water because both the solvent and the water are polar. In such an embodiment, the solvent could be squeezed out of porous cake 36 and a surfactant would not be required. However, in certain embodiments, such as when diesel was used as a solvent, a thin film of diesel may remain on the particulates in porous cake 36 and it is advantageous to add surfactant to the spacer pill or the reactor pill to wash away the diesel film to improve the reaction of the binder. In an embodiment of this disclosure, high molecular weight glycols or polyethyleneglycols and poloxylate glycols in the molecular weight range of 50-800 grams per mole that exhibit cloud point properties could be employed. Mixtures of water and these organic solvents remain in a single phase at room temperature but separate in two immiscible phases as the temperature is raised. This property of mixed solvent can be used to assist kinetics of the binder activation.

If a resin is used as the binder then the solvent can be a fluid that will reduce the kinetics of a chemical reaction of the resin. The fluid can be a single solvent such as alcohol or glycol or can be a mixture of mixable solvents, such as a mixture of glycol and water or a mixture of ethanol and water. Single solvents can be tailored to have a significantly lesser or greater kinetics. Mixed solvents can be used to control the rate of dissolution of the resin and can vary the reaction rate of trapped resin in the fibrous network. In addition, mixtures of immiscible solvents of significantly different polarity, such as a mixture of diesel and water, can be homogenized as a single phase solvent system using emulsifiers. As an example, if the resin is a resin that swells or reacts in contact with water, then the solvent can be a non-aqueous solvent and the reaction kinetics between the resin and the non-aqueous solvent will be low. However if a mixture of solvents is used a partial reaction or conditioning status can be established in advance of delivering a subsequent pill.

If a cement is used as the binder then the solvent can be a fluid that will reduce the kinetics of a chemical reaction of the cement. As an example, the solvent can be alcohols (C1-C8 branched or unbranched) glycols or polyols, aromatic solvents such as xylene, toluene, diesel, or straight chain hydrocarbons and mineral oils (C6-C30). Commercially available solvents such as acetone, high boiling point ester solvent such as tertiary butyl ethyl ester may be used for different class of cements to suspend the cement particles without causing the cement to harden even at elevated downhole temperatures.

In some currently available systems, when a cement is being used for sealing a loss circulation zone the drill pipe is retrieved and the drill bit is removed so that the cement can be delivered through an open end of the drill pipe. This extra step is required so that the cement does not block the circulation port of the drill bit as the cement thickens while being delivered through the drill pipe. Because systems and method of this application utilize a solvent that will reduce or prevent the activation of the binder, then even if the binder is a cement, loss circulation product 34 can still be delivered through the drill bit when the size of each component of the pill is 1 cm or smaller. In embodiments of this disclosure, regardless if the binder is a starch, a monomer, a polymer, a resin, a cement, or a combinations of such example binders, loss circulation product 34 can be delivered through the drill bit when the size of each component of the pill is 1 cm or smaller.

In alternate embodiments, if the size of a component of the pill is larger than 3 cm the pill can be pumped through an open drill pipe or through the tubing casing annulus. As an example, in an embodiment where there is severe loss circulation, a binder or fibrous material 42 with a size of larger than 3 cm may be preferable for plugging fracture 32. If the pill is pumped through a closed drill pipe, the pill can be pumped through a circulation sub without passing through the drill bit. In alternate embodiments for extreme loss circulation scenarios components if the pill is larger than 5 cm then the pill is pumped through the tubing casing annulus and delivered to fracture 32 whilst remaining fluids can return through the drill pipe in a reverse circulation methodology.

If a non-pregelatinized starch is used as the binder then the solvent can be a fluid that will reduce the kinetics of a chemical reaction of the starch. As an example, the solvent can be diesel or other non-aqueous solvent, such as alcohol or glycol, in which starch does not hydrate or gelatinize. Using a non-aqueous solvent is important because if a non-pregelatinized starch mixes with water the starch a gelatinization reaction can take place when the non-pregelatinized starch reaches a temperature of about 60° C., a temperature that can be reached within the dill pipe or bit, which could block the flow of fluids through the drill pipe or bit.

In alternate embodiments, the solvent that is used in loss circulation product 34 can be an organic solvent. In other alternate embodiments the solvent that is used in loss circulation product 34 can be a mixture of organic solvent or mixture miscible aqueous and organic solvents with or without the aid of an emulsifying agent.

In alternate embodiments, a foaming reagent can be included with the solvent in loss circulation product 34. The foaming reagent can be selected to produce a foamed binder. As an example, a baking soda ($NaHCO_3$) can be used as a solid that will react to create a gas. The baking soda would not dissolve in the solvent. The reactor pill could include an acid that would react with sodium bicarbonate and the resulting gas would be trapped in loss circulation sealant 46 as the binder is reacting with the activator to form a honey-comb like structure of loss circulation sealant 46. In other alternate embodiments, polyurethane binders can seal the fibrous network using organic solvents in fracture 36. Polyurethane is water sensitive and in contact with water reacts exothermically and generates carbon dioxide and steam. In the presence of a foaming agent a honey comb structure will be developed. If polyurethane resin is trapped in the loss circulation matrix using non aqueous solvent and water delivered as one of the component of the third pill in combination with a foaming agent, then water initiates reaction resulting in a hard foam structure.

Activator

The activator that is delivered as part of the reactor pill, or in alternate embodiments, part of one of the other pills, contains the chemicals and solvent required to assist with bringing about an in-situ chemical reaction of the binder. As shown in FIG. 3, when the activator is part of the reactor pill, the activator will percolate through porous cake 36 to contact the binder and cause an in-situ activation of the binder at the zone of interest. In alternate embodiments, as described in this disclosure, the activator can instead be delivered as part of the first pill and the reactor pill can include the binder upon which the activator will act. In other alternate embodiments, both the activator and the binder can be located in the same pill together with a solvent that will prevent the reaction between the activator and the binder from occurring.

If a monomer or polymer is used as the binder then the activator can be a fluid that will cause a reaction or activation of the monomer or polymer so that the monomer or polymer becomes thicker, gelatinous, or hardens. As an example, if the monomer or polymer is a monomer or polymer that swells in contact with water, the activator can include water.

If a resin is used as the binder then the activator can be a fluid that will cause a reaction or activation of the resin so that the resin becomes thicker, gelatinous, or hardens. As an example, if the resin is a resin that swells in contact with water, the activator can include water.

If a cement is used as the binder then the activator can be a fluid that will cause a reaction or activation of the cement so that cement becomes thicker or hardens. As an example, if the cement is a cement that is activated when the cement comes in contact with water, the activator can include water. In alternate embodiments, the activator can include an accelerator such as calcium chloride, sodium meta silicate, potassium chloride, calcium bromide, sodium or calcium aluminate, sodium silicate or gypsum.

If a cement is used as the binder then reaction can be delayed using retarders such as natural or modified ligno-sulphonates retarders, cellulose based derivative retarders such as carboxymethyl hydroxyl cellulose and hydroxyethyl cellulose, hydroxycarboxylic acid retarders such as cirtic, acid tartaric acid, gluconic acid, glucoheptonate, or synthetic retarders such as maleic anhydride or AMPS copolymers and Inorganic retarders such as borax, boric acid and zinc oxide.

If a non-pregelatinized starch is used as the binder then the activator can be a fluid that will cause a reaction or activation of the starch so that the starch becomes thicker, gelatinous, or hardens. As an example, if the starch is a starch that swells in contact with water, the activator can include water. Water will hydrate the starch and break open the exoplasm of the granule and release the starch. In alternate embodiments, a cross linker such as formaldehyde or a glyoxal under appropriate pH condition can react with the released starch and cross link the starch and increase viscosity of the gelatinous consistency of loss circulation sealant 46.

The activator can also include a surfactant. The surfactant can assist in dissolving the solvent from the surface of the binder and expose the binder to the activator. As an example, a surfactant can assist in washing diesel or other water immiscible solvents from the binder and reduce reaction time to give a more consistent product. In embodiments where the solvent is a viscous organic solvent, such as an oil, then the concentration of surfactant can be used to adjust the reaction rate. The concentration of surfactant can affect how quickly the solvent is washed off the particles of the binder and can therefore be adjusted to either speed up or slow down the activation of the binder. The surfactant can be an anionic, cationic, non-ionic, or amphoteric surfactant.

In other alternate embodiments, a pH adjuster, solvents, additional monomer or polymer, or other additives can be added to the activator to assist in exposing the binder to the activator or to speed up the reaction or activation of the binder. As an example, calcium chloride can be used as part of the activator to accelerate activation of the binder when the binder is a cement or when the binder includes sodium alginate.

Looking at FIG. 2, when first reactant 40, which may be the binder or the activator, is exposed to second reactant 44, which is the other of the binder or the activator, then the binder undergoes a reaction or is activated so that the porosity of porous cake 36 is reduced and porous cake 36 becomes loss circulation sealant 46. A pressure differential due to the hydrostatic column of fluids within wellbore 12 can then help squeeze loss circulation sealant 46 into fracture 32.

In alternate embodiments, a foaming reagent can be included with second reactant 44. The foaming reagent can be selected to produce a foamed loss circulation sealant 46.

Test Results

Laboratory tests have been performed on embodiments of this disclosure. An embodiment using un-gelatinized starch as a binder was investigated. When the un-gelatinized starch was mixed with water at temperatures less than 60° C., the starch particles acted like sand particles and allowed water filtering rapidly through the starch granules. The starch granules did not affect the fluid loss properties of the tested los circulation product, even at extreme starch concentration, such as 100 grams (g) of powdered starch being added to 100 ml of water.

In an example test, a malleable loss circulation material that included fibers and granular loss circulation particles was mixed with up to a 1:1 concentration of un-gelatinized starch. As the material was heated to a temperature greater than the gelatinization temperature, the content of exoplasm starch granules were released. The material then hydrated with free water and formed a malleable solid mass with a texture similar to a thick dough. The resulting decreased porosity mass had a decreased permeability similar to a permeability of rubber and exhibited no fluid loss property. The properties of the malleable material with decreased porosity and permeability were exhibited at example downhole temperatures and pressures.

In an example laboratory test, 140 g/liter of commercially available fibrous material and 140 g/liter of un-gelatinized starch was deposited across fractures. The temperature was raised and a malleable, rubbery plug was formed. Starch gelatinization was completed at 100° C. in the presence of water within thirty minutes of forming the cake at room temperature. After the pressure was increased, the plug showed no fluid loss property.

Under a pressure of 500 psi, the plug extruded very slowly through a 2 mm fracture at an extrusion rate of approximately 10 milliliters per minute. When the pressure as reduced to 200 psi, the plug stopped extruding.

In example embodiments, the extrusion rate could be controlled by adjusting the amounts of starch, fibrous material, and particles of the loss circulation product. If the concentration of starch can be increased to more than 50% by volume of the loss circulation product, and in the amount of fibrous material could be in a range of 10 to 100 lb/bbl. The concentration of starch in the fibrous structure will have a direct impact on the mechanical strength of the resulting plug. Using a larger amount of starch will result in a plug with a rubbery-like consistency, which is able to flow into fractures due to the gelatinous nature of starch.

In alternate embodiments, as the concentration of starch is reduced, then the starch acts only as binder or paste that fills the void space between the fibers. The mechanical strength of the plug of such an embodiment is derived primarily from the fibrous and granular network with some additional strength provided by gelatinized starch.

In an example of operation, looking at FIGS. 1-2, in order to seal loss circulation zone 28 of subterranean well 10, loss circulation product 34 can be delivered into subterranean well 10 as a first pill. Loss circulation product 34 can include fibrous material 38 and first reactant 40 in a solvent. Fibrous material 38 can form a matrix and trap first reactant 40 to form porous cake 36 across fracture 32.

As porous cake 36 is formed, the solvent is flushed into loss circulation zone 28, washing away any mobile water and other fluids that are trapped in surrounding rock. In this manner, first reactant 40 is not exposed to water or other formation fluids, but remains surrounded by the solvent of the first pill.

Looking at FIGS. 3-4, second reactant 44 can be delivered into wellbore 12 of subterranean well 10. Second reactant 44 can percolate and pass through porous cake 36. As second reactant 44 passes through porous cake 36 second reactant 44 can react with first reactant 40 so that first reactant 40 reduces the porosity of porous cake 36 across fracture 32 and forms loss circulation sealant 46 of loss circulation product 34, which can seal loss circulation zone 28. The activation of the binder and formation of loss circulation sealant 46 from loss circulation product 34 can take place, as an example, over a range of one to thirty minutes, depending on the composition of porous cake 36 and second reactant 44, as well as the downhole pressure and temperature conditions. In certain embodiments, the activation of the binder and formation of loss circulation sealant 46 from loss circulation product 34 can take place within five minutes.

Looking at FIG. 5, a pressure within wellbore 12 and pressure differential between wellbore 12 and loss circulation zone 28 can cause loss circulation sealant 46 to be squeezed into fracture 32. The extrusion rate of embodiments of this disclosure depend not only on the concentration and type of the binder, but also on the composition and characteristics of fibrous material 38 and particulate matter 42. In example embodiments of this disclosure, loss circulation sealant 46 can be developed to have an extrusion rate of about 20 ml/minute across a fracture with an area of 3 mm high by 2 mm wide by 4 cm deep. Extruded product could fill the depth of fracture and then the extrusion rate would reduce and come to a near complete stop, within thirty minutes, or alternately within five minutes. In such embodiments, fracture 32 can be completely plugged. If any excess material 48 is located outside of fracture 32 within wellbore 12, after drilling resumes excess material 48 is drilled, washed, or shaved off, leaving the material in fracture 32 intact.

Embodiments described in this disclosure therefore provide a first pill that creates a porous cake over a fracture of a loss circulation zone, trapping a binder in a stationary position until an activator of a reactor pill is flushed through the porous cake to activate the binder. Systems and methods of this disclosure produce a more uniform product compared to systems where the mixing of two mobile pills within the fracture is a requirement. Because the activator can cause immediate activation of the binder upon contact with the binder, the risk of the porous cake migrating or becoming displaced from the fracture in the time it takes to activate the binder is minimized. In embodiments of this disclosure the resulting plug that seals loss circulation zone can be solid or foamed. The mechanical properties of the plug can be hard, rubbery, or dough-like.

Embodiments of this disclosure, therefore, are well adapted to carry out the objects and attain the ends and advantages mentioned, as well as others that are inherent. While embodiments of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A method for sealing a loss circulation zone of a subterranean well, the method including:
   delivering a loss circulation product into a wellbore of the subterranean well, where the loss circulation product has:
     a non-aqueous solvent;
     a fibrous material; and
     a first reactant that is a granular starch that is non-pregelatinzed; where
     the fibrous material traps the first reactant to form a porous cake across a fracture of the loss circulation zone; and
   delivering a second reactant that includes water into the wellbore of the subterranean well, the second reactant passing through the porous cake and reacting with the first reactant, gelatinizing the granular starch and reducing a porosity of the porous cake across the fracture to form a loss circulation sealant that is a malleable solid mass, the loss circulation sealant being squeezed into the fracture so that the loss circulation product seals the loss circulation zone.

2. The method of claim 1, where the fibrous material includes a natural fiber.

3. The method of claim 1, where the loss circulation product further includes a particulate matter.

4. The method of claim 1, further including after delivering the loss circulation product into the wellbore and before delivering the second reactant into the wellbore, delivering a spacer fluid into the wellbore of the subterranean well.

5. The method of claim 1, where after delivering the second reactant into the wellbore of the subterranean well, the first reactant reacts fully with the second reactant within thirty minutes.

6. The method of claim 1, where after delivering the second reactant into the wellbore of the subterranean well, the first reactant reacts fully with the second reactant within five minutes.

7. The method of claim 1, where after delivering the second reactant into the wellbore of the subterranean well, the reducing of the porosity of the porous cake across the fracture and a pressure differential between the wellbore and the loss circulation zone causes the loss circulation sealant to be squeezed into the fracture.

8. The method of claim 1, where the second reactant passing through the porous cake and reacting with the first reactant reduces the permeability of the porous cake.

9. The method of claim 1, where the non-aqueous solvent is selected from a group consisting of a diesel, an alcohol, or a glycol.

10. The method of claim 1, where the non-aqueous solvent prevents the gelatinization of the granular starch while the loss circulation product is delivered into the wellbore of the subterranean well with temperatures of at least 60° C.

11. The method of claim 10, where the non-aqueous solvent prevents the gelatinization of the granular starch until the second reactant reacts with the first reactant.

12. A method for sealing a loss circulation zone of a subterranean well, the method including:
delivering a loss circulation product into a wellbore of the subterranean well, where the loss circulation product has:
a non-aqueous solvent;
a fibrous material; and
a starch binder that is a granular starch that is non-pregelatinzed; where
the fibrous material traps the starch binder to form a porous cake across a fracture of the loss circulation zone;
the non-aqueous solvent prevents the gelatinization of the starch binder as the loss circulation product is being delivered into the wellbore; and
delivering an activator into the wellbore of the subterranean well, the activator including water and passing through the porous cake so that the water reacts with the starch binder such that the starch binder gelatinizes and reduces a porosity of the porous cake to form a loss circulation sealant, the loss circulation sealant being a malleable solid mass that is squeezed into the fracture by a pressure differential between the wellbore and the loss circulation zone to seal the loss circulation zone.

13. A system for sealing a loss circulation zone of a subterranean well, the system including:
a porous cake formed across a fracture of the loss circulation zone of a wellbore, the porous cake formed by a loss circulation product having:
a non-aqueous solvent;
a fibrous material; and
a first reactant that is a granular starch that is non-pregelatinzed, where the fibrous material is operable to trap the first reactant to form the porous cake;
a second reactant that includes water, selected to react with the first reactant to gelatinize the granular starch as the second reactant passed through the porous cake, such that porosity of the porous cake across the fracture is reduced to form a loss circulation sealant that is a malleable solid mass, the loss circulation sealant being squeezed into the fracture, sealing the loss circulation zone.

14. The system of claim 13, where the fibrous material includes a natural fiber.

15. The system of claim 13, where the loss circulation product further includes a particulate matter.

16. The system of claim 13, further including a spacer fluid, the spacer fluid being deliverable into the wellbore of the subterranean well before the second reactant.

17. The system of claim 13, where the non-aqueous solvent is selected from a group consisting of a diesel, an alcohol, or a glycol.

18. The system of claim 13, where the non-aqueous solvent is operable to prevent the gelatinization of the granular starch within the subterranean well with temperatures of at least 60° C.

19. The system of claim 13, where the non-aqueous solvent is operable to prevent the gelatinization of the granular starch until the second reactant reacts with the first reactant.

* * * * *